March 12, 1940.  A. J. COBHAM ET AL  2,193,312
MEANS FOR ESTABLISHING A CABLE OR LIKE CONNECTION BETWEEN AIRCRAFT IN FLIGHT
Filed Jan. 3, 1939  5 Sheets-Sheet 2
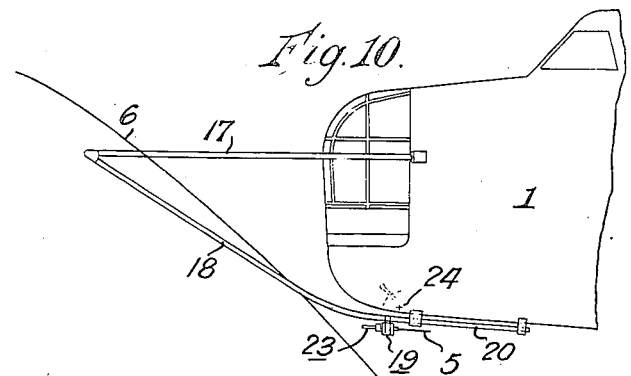
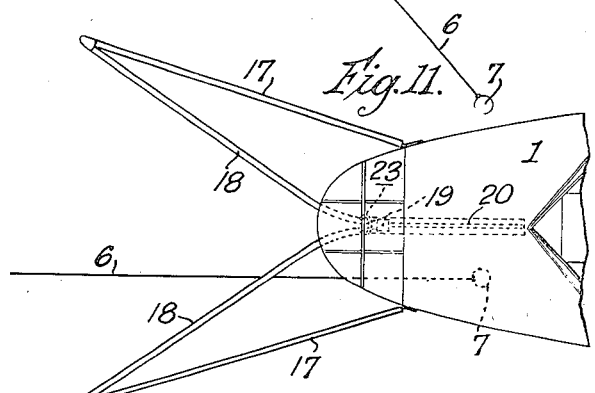
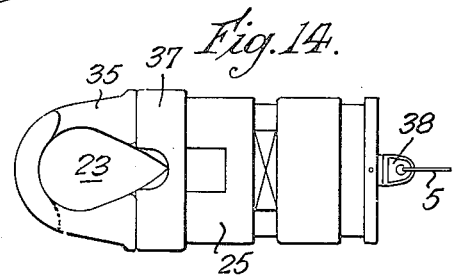
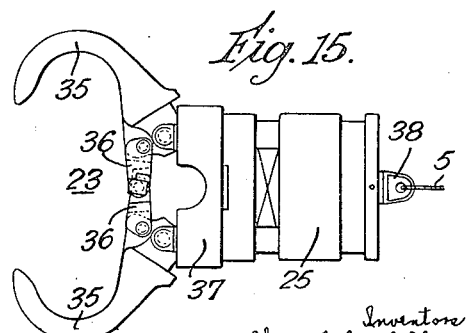
Inventors:
Alan John Cobham,
Percy Raymond Allison, and
Edward James Tripp; by their attorneys,
Baldwin & Wight

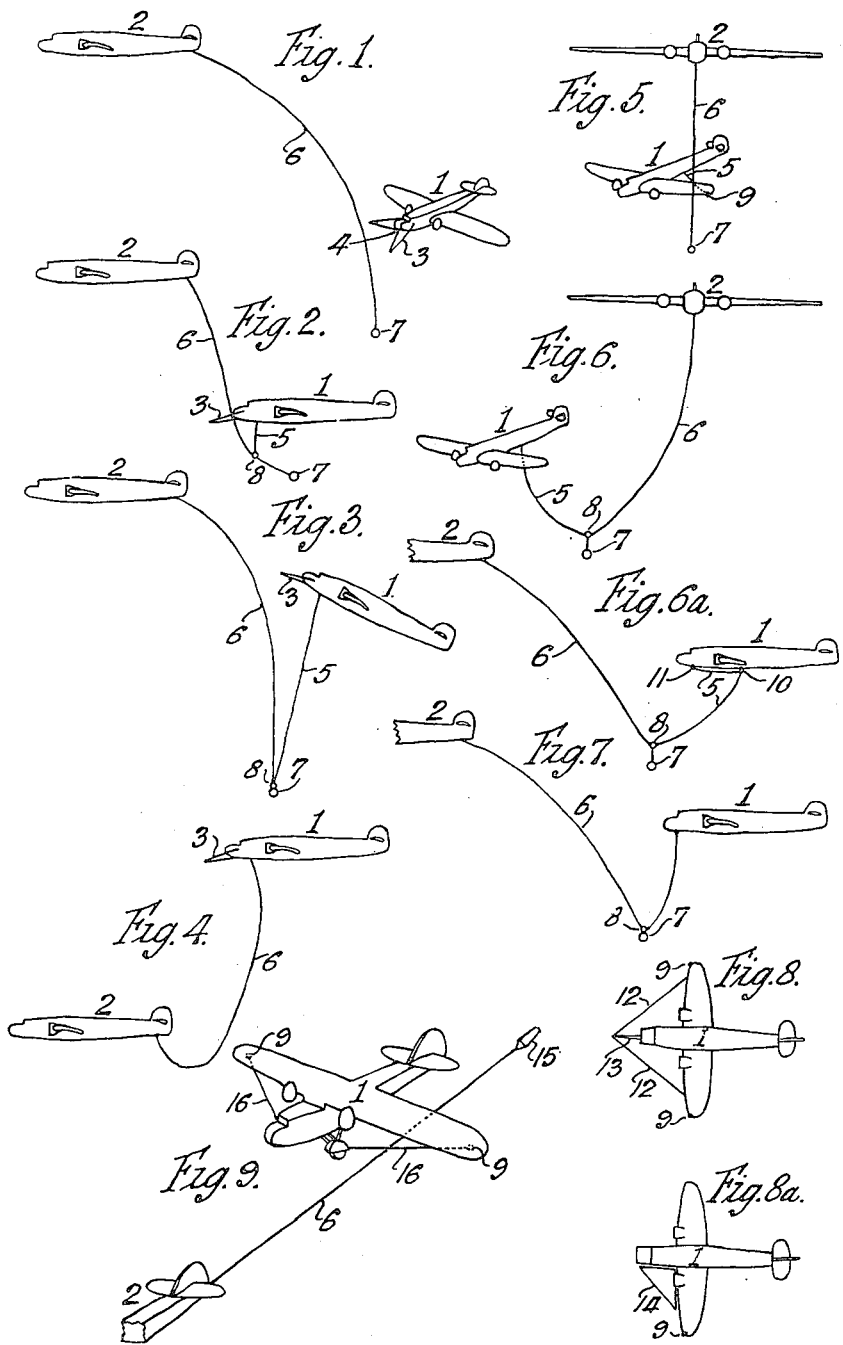

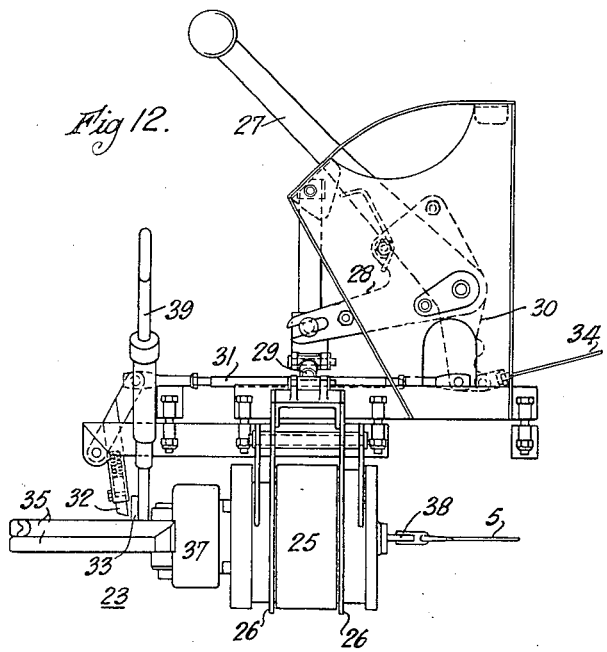
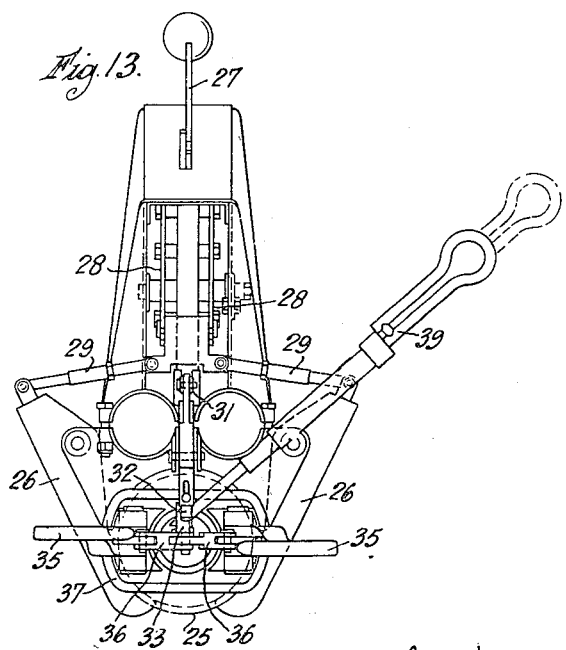

Inventors;
Alan John Cobham;
Percy Raymond Allison, and
Edward James Tripp;
By their Attorneys,
Baldwin & Wight March 12, 1940.  A. J. COBHAM ET AL  2,193,312
MEANS FOR ESTABLISHING A CABLE OR LIKE CONNECTION BETWEEN AIRCRAFT IN FLIGHT
Filed Jan. 3, 1939  5 Sheets-Sheet 5
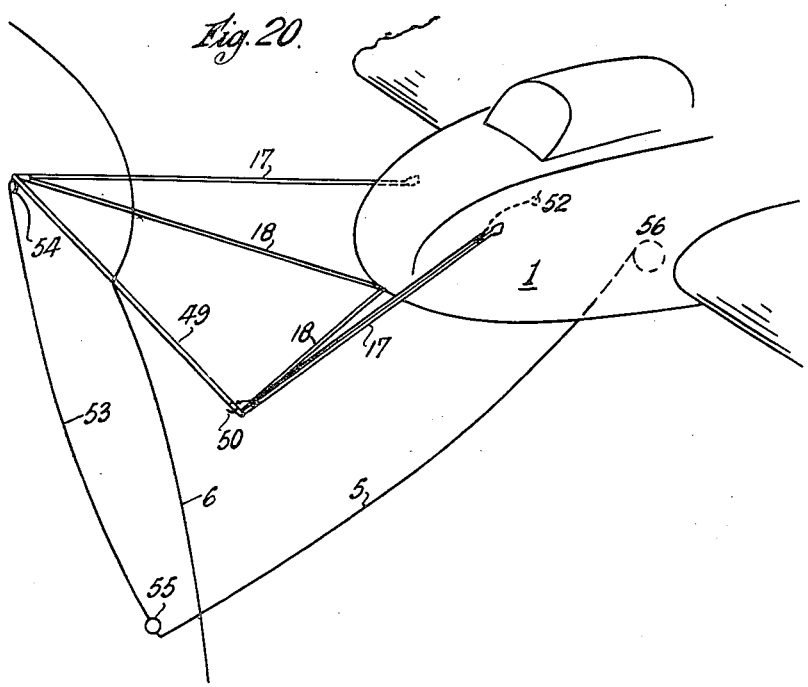
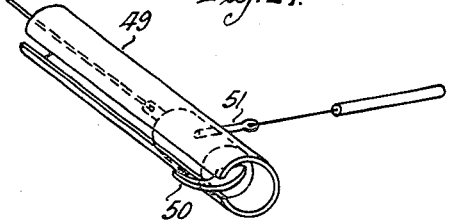
Inventors:
Alan John Cobham,
Percy Raymond Allison, and
Edward James Tripp;
By their attorneys,
Baldwin & Wight Patented Mar. 12, 1940

2,193,312

UNITED STATES PATENT OFFICE

2,193,312

MEANS FOR ESTABLISHING A CABLE OR LIKE CONNECTION BETWEEN AIRCRAFT IN FLIGHT

Alan John Cobham, Percy Raymond Allison, and Edward James Tripp, Yapton, England, assignors to Flight Refuelling Limited, London, England, a company of Great Britain Application January 3, 1939, Serial No. 249,114
In Great Britain January 5, 1938

23 Claims. (Cl. 244—137)

This invention relates to improved means for establishing a cable or like connection between aircraft in flight as a preliminary step in the process of making transferences from one aircraft to another. It is to be understood that the expression "cable or like connection" is intended to include any kind of flexible line passing between the aircraft such as a cord rope, wire, band, chain, tube or the equivalent. Hereinafter the word "cable" will be used simpliciter to denote such means of connection.

By means of the establishment of cable connection between aircraft it is rendered possible to provide means for transferring, for instance, fuel, goods of various kinds, and living beings, as well as less concrete things such as power. It will be understood that the cable connection initially established may serve as a means of establishing a different form of cable connection as, for instance when in flight refuelling an ordinary line connection is first made and this is used to pull out a hose between the aircraft.

According to the present invention apparatus for establishing a cable connection between aircraft in flight comprises means on one aircraft for intercepting a cable trailing from a second aircraft and guiding the cable into a cable-engaging device releasably-mounted on the first aircraft but retained in connection therewith by a second cable on release from its mounting.

The cable-engaging device is preferably in the nature of a clip- or pincer-like device which is adapted to be closed automatically or at will so as to retain the cable whilst allowing it to move longitudinally through the device. A trip mechanism may be provided with the device, which is suitably operated by contact of the cable therewith automatically to close the clip- or pincer-like device. This mechanism may be connected to the mounting of the cable-engaging device so as to effect automatic release of that device when the clip- or pincer-like device has closed.

Various means may be employed for intercepting the trailing cable and guiding it into the cable-engaging device. Thus the means may comprise a structure projecting forwardly of the aircraft and presenting to the front a comparatively wide mouth or opening for the admission of the trailing cable. The sides of the structure leading back from the mouth towards the aircraft converge to a place where the cable-engaging device is mounted. When the trailing cable has entered the mouth of the structure it will be guided by the sides of the structure to the cable-engaging device.

Preferably the cable-intercepting structure is mounted at the nose of the aircraft so that the sides of the structure converge towards a point on the under part of the nose. The structure may comprise in essence two arms radiating forwardly and outwardly from a point on the nose and being of sufficient length to provide a wide enough mouth to ensure that the pilot of the aircraft under ordinary circumstances will intercept the trailing cable. The forwardly and outwardly projecting arms may each comprise a return portion leading back one to each side of the nose whereby the structure is rigidified and its mounting firmly secured. In such a form it will be appreciated that the structure comprises two U- or V-shaped members or portions with one arm of each U or V connected one to each side of the nose and the other arms meeting at substantially a common point near the bottom of the nose.

Alternatively the leading edge of a wing of an aircraft may be used to intercept the trailing cable and to guide the trailing cable to a point at or nearer the wing tip at which point the cable engaging device is mounted.

In a further form a flexible or rigid member may be provided, extending from the nose of an aircraft or from an extension thereof to a point on a wing of the aircraft on which wing the cable-engaging device is mounted. As an alternative to this construction, the intercepting member may extend from an under part of the aircraft—e. g., a wheel fairing—to the lower side of a wing on which the cable-engaging device is mounted. Obviously in both these last mentioned alternative constructions the intercepting member may be duplicated so as to extend from the nose or under part of the aircraft, as the case may be, to both wings, two cable-engaging devices being provided, one on each wing.

In a still further form there is provided a structure which extends forwardly of the aircraft and comprises a transverse member which serves to intercept the trailing cable. This structure may be similar to the forwardly projecting structure that has hereinbefore been described except that a transverse member extends across the front of it. The cable-engaging device is releasably mounted on the transverse member, and when released is adapted to run across substantially the whole length of the members, so as to catch and retain the intercepted trailing cable, and then drop clear of the structure.

Preferably the transverse member is in the form of a C-shaped tube open at at least one end in which the cable-engaging device is adapted to slide, the slit of the tube being directed towards the front with the clip or pincer portion of the cable-engaging device projecting through it.

The cable-engaging device may be held at one end of the tube by means releasable at will, and be connected to a cable which passes along the tube through the open end to a depending weight, which latter is connected by a cable to the aircraft.

It may here be remarked that when the trailing cable has been intercepted the end of the cable will tend to rise up towards the underneath part of the intercepting aircraft due to the fact the trailed length of cable has suddenly been shortened since when the contact is made the cable is in effect being trailed from the point of contact of the cable with the intercepting aircraft. It is therefore generally to be desired that the cable-engaging device should be released promptly from the intercepting aircraft and that should have sufficient weight to counteract quickly the rising tendency of the end of the trailing cable, this weight being either in the body of the device or in another member connected to the device. In this connection it may be helpful if the intercepting aircraft is manoeuvered immediately after the trailing cable has been caught so as to change its position relative to the other aircraft in the sense of increasing the distance between the aircraft whereby the trailing cable is soon taken out of direct contact with the intercepting aircraft.

As has already been mentioned the term "cable" includes many forms of flexible line and amongst these may particularly be mentioned a pipe or hose for passing fuel from the intercepting aircraft, or supply or tanker aircraft as it may be called, to the aircraft trailing the cable, which aircraft may be termed the "receiver" aircraft.

Preliminary connection between the two aircraft may be made generally by means of a light trailing cable and this may be used for pulling a fuel hose from the tanker aircraft to the receiver aircraft. A cable of such gauge and material may be used for this preliminary connection that if it did contact with the propellers of supply aircraft it would be immediately severed without damage being done.

The nozzle of the fuel hose may be directly attached to the cable-engaging device so that when the trailing cable has been intercepted and engaged and subsequently has been hauled into the receiver aircraft the nozzle will be brought to the receiver aircraft where it can be connected manually or automatically with a feed to its fuel tanks. Preferably, however, the nozzle of the fuel hose is not directly connected to the cable-engaging device but a lighter cable is connected to the latter, and, when the trailing line has been caught and the supply aircraft flown to a higher position, an operator aboard the supply aircraft draws in the lighter cable, bringing with it the cable from the receiver aircraft the end of which cable can be then attached to the nozzle or other convenient part of a fuel hose, whereafter the receiver aircraft can draw in its cable and bring with it the fuel hose from the tanker aircraft.

The invention is illustrated in the accompanying drawings wherein:

Figures 1–4 are diagrammatic views of a method of establishing a cable contact between aircraft in accordance with the invention, employing one form of intercepting and guiding means;

Figures 5–7 are similar views wherein a different form of intercepting and guiding means are used;

Figures 8, 8a and 9 are diagrammatic views showing other forms of intercepting and guiding means;

Figure 10 is a side elevation and Figure 11 a plan view of the intercepting and guiding means indicated in Figures 1–4;

Figures 12–13 are respectively side and front elevations of a manual control of the cable-engaging device.

Figures 14–15 are plan views in the closed and open positions of one form of cable-engaging device designed for mounting in the nose of an aircraft.

Figure 20 is a diagrammatic view of further intercepting means and Figure 21 a detail view thereof.

Figure 16:
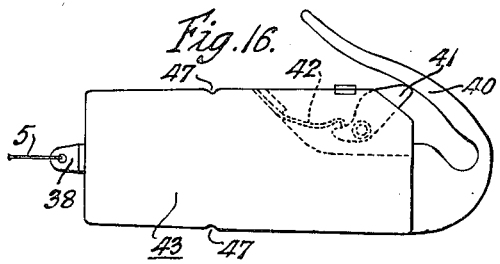
Figures 16–18 are detail views of another form of cable-engaging device designed for mounting on a wing.

Referring to Figures 1–4 of the drawings, these illustrate the method of forming a cable connection between a tanker aircraft 1 and a receiver aircraft 2 as a preliminary step in the refuelling of the aircraft 2 in flight. It will be seen that the tanker aircraft carries a horn-like structure 3—which will hereinafter be described in detail— extending forwardly from the nose of the craft, and a cable-engaging device releasably mounted at the juncture of the horns, that is at the point 4, which device is connected to a cable 5 which passes on to a winch mounted in the aircraft.

To establish connection between the two aircraft, the receiver aircraft 2 pays out a cable 6 provided at its end with a detachable weight 7 which controls to a certain extent the trailing angle of the cable 6. The tanker aircraft 1 flies behind and below the airchaft 2 to intercept the cable 6 with its horns 3 as shown in Figure 1. When it has been intercepted, the cable 6 is guided by the horns into the cable-engaging device, which is of pincer-like form and the jaws of which close round the cable and retain it within an eye through which the cable may longitudinally move. When the cable 6 has thus been caught, the cable-engaging device is automatically or manually released from its mounting and runs down the cable 6 as shown at 8 in Figure 2, the device being retained in connection with the aircraft 1 by the cable 5. The cable-engaging device is preferably weighted, for example by a sinker weight, so that it will run quickly down the cable 6 to engage with the weight 7 and by reason of the addition of its weight to that of the weight 7 cause the trailing cable 6 to take a steeper trailing angle and therefore take the trailing cables 5 and 6 away from the intercepting aircraft. If desired the cable-engaging device and the weight 7 on the end of the trailing cable may be so shaped as automatically to interlock when they engage one another.

When connection has thus been made, the aircraft 1 rises as shown in Figures 3 and 4 to a position above the receiver aircraft 2, at the same time hauling in, by means of its winch, the cable 5 until the weights 7 and 8 are inboard of the tanker aircraft 1. An operator in the tanker then detaches the cable 5 from the cable 6 and secures to the latter cable the nozzle end of a fuel hose. When the tanker 1 has reached a suitable position above the receiver 2, an operator on the receiver 2 draws in the cable 6 and with it the fuel hose.

The advantages of the particular form of intercepting and guiding means illustrated are that the pilot of neither craft has to effect any complicated manoeuvre to establish contact, and that the pilot of the tanker aircraft has the trailing cable ahead of him when making contact, which is particularly advantageous when operating at night.

Figures 5-7 illustrate the manner of establishing the cable connection when a wing of the tanker is used as the intercepting and guiding means. In the particular case illustrated the port wing of the tanker 1 is employed for intercepting the trailing cable 6, the cable-engaging device being mounted in the port wing tip at 9 and being retained in connection with the tanker 1, after release from its mounting, by the cable 5 which passes to a quick release device at 10 on the fuselage about midships of the aircraft and then forward to the winch near the cockpit at 11.

The method of making contact in this case is for the tanker to fly below the receiver aircraft diagonally across the latter's line of flight from the port side and to intercept the trailing cable 6 with the leading edge of the port wing (see Figure 5). The tanker's line of flight causes the cable to race along the wing to port and be thus guided into the cable-engaging device, which is dragged out of its mounting by the pull of the cable 6 and drops well below and clear of the tanker hanging on the cable 5 from the quick-release device 10 (viz Figures 6 and 6a). An operator then releases the quick-release device, so that the cable 5 now hangs directly from the winch at 11 (viz Figure 7). The tanker then climbs above the receiver aircraft hauling in the cable 5, the remainder of the operation being identical with that described above for Figures 1-4. The purpose of providing a temporary connection at the quick release device in this construction is to ensure that the cables do not pass across the propellors as the point of connection between the aircraft is altered from the wing tip to the fuselage. In Figure 8 the tanker 1 is provided with a flexible or rigid member 12 extending from a bowsprit 13 on the nose on both sides to points near the wing tips on each of which a cable-engaging device is mounted in like manner as in the case of Figures 5-7. The member 12 may be a cord or cable and extends sufficiently far along the wings to prevent the trailing cable 6 contacting with the propellers of the aircraft, when these are located in front of the wing. By arranging the member 12 to extend to both wings, the tanker may be flown from either side into the trailing cable, the cable 6 being guided to one or other wing-tip according to the tanker's line of flight.

Figure 8a shows a member in the form of a rigid triangle 14 of light metal tube, swaged rod or the like secured on two sides to the nose and wing respectively, and having its third side extending between the nose and a point some way along the leading edge of the wing. A similar structure may be provided in front of the other wing.

The intercepting and guiding means shown in Figures 8 and 8a have the advantage over those shown in Figures 5-7 that they substantially increase the horizontal plane of action of the tanker's pilot, because he has the whole span from nose to wing tip on which to make contact with the trailing cable 6, whereas in the previous construction he has generally to make contact near the tip of the wing to avoid the risk of the cable 6 fouling his propellers.

The cable 6 trailed by the aircraft 2 may in some cases have its weight 7 replaced by a drogue 15 (viz Figure 9) so that the cable trails nearly horizontally. Whilst the intercepting and guiding means above described may still be used in this case, their use would involve more careful and awkward manoeuvering of the tanker in making contact. For example a horn-like structure 3 shown in Figures 1-4 could be employed, the structure being fixed on the nose in such a manner as to project downwardly as well as forwardly. It is preferred, however, to use the means shown in Figure 9, namely a cable or similar member 16 stretching from an under part of the aircraft—e. g., a wheel fairing—to the underside of a wing (or both wings) the cable-engaging device being on the under side of the wing at 9. To intercept the trailing cable 6 the tanker 1 is flown down on to the cable at an angle to it so that the cable is guided into the cable-engaging device, which is pulled out from its mounting as described with reference to Figures 5-7.

Figures 10 and 11 show in greater detail the construction of the horn-like intercepting structure mentioned in respect of Figures 1-4, mounted on the nose of the aircraft 1. The structure comprises two V-shaped members formed of rods or tubes, one arm 17 of each member being connected one on each side of the nose of the aircraft, and the other arms 18 converging to a point 19 just below the nose of the aircraft and then extending for a short distance side by side at 20 along the under part of the fuselage to which they are secured.

The pincer-like cable-engaging device 23 is releasably mounted at the point 19 with its open jaws spanning the converging gap between the arms 18, viz. Figure 11. Within the cockpit of the aircraft is provided at 24 a manual mechanism for controlling the release of the device 23, this mechanism being shown in detail Figures 12 and 13. The cable 5 which is secured to the device 23 runs beneath the fuselage and into the winch (not shown).

Referring now to Figures 12-15, the pincer device 23 has a weighted body 25 held in jaws 26 which are opened and closed by movement of a handle 27 through lever mechanism 28, 29. The handle 27 is also linked by its cranked portion 30 and a rod 31 to a trigger mechanism for closing the jaws of the device 23. This trigger mechanism comprises a finger 32 which is rocked to press against the plate 33 forming part of a trip device—described in detail below—which operates to close the jaws of the pincers 23. Also connected to the cranked part 30 of the handle is a control wire 34 adapted to release a brake on the winch about which the cable 5 is wound.

In detail the pincer-device 23 comprises two pivoted jaws 35 connected at their base by links 36 which form part of the trip device. These links, in the open position of the jaws (Figure 15), are arranged to form an over-centre mechanism maintaining the jaws open. Behind the jaws is the weighted body 25—to which the cable 5 is secured through the eye 38—comprising a sliding collar 37 urged by a spring provided within the body 25 in such a manner as to close the jaws 35 when the links 36 are moved out of the over-centre position. This movement of the links 36 may be caused either by the trailing cable 6 entering the jaws or by the mechanism 32, 33 described above, or that mechanism may be used to ensure that the jaws are closed in case the cable 6 fails to operate the trip device.

To lock the jaws in the open position, there is provided a pull and push rod 39 whose end is adapted to lie behind the plate 33 and prevent this being pressed back by the finger 32 to operate the links 36.

In place of the manually controlled release of the cable-engaging device, the release of the device may be automatically effected by the trip device, combind with the cable-engaging device or the cable-engaging device may be so mounted on the aircraft that the pull of the trailing cable 6 on the cable-engaging device caused by an increase in the distance between the aircraft 1 and 2 drags the cable-engaging device away from the aircraft.

Figure 17:
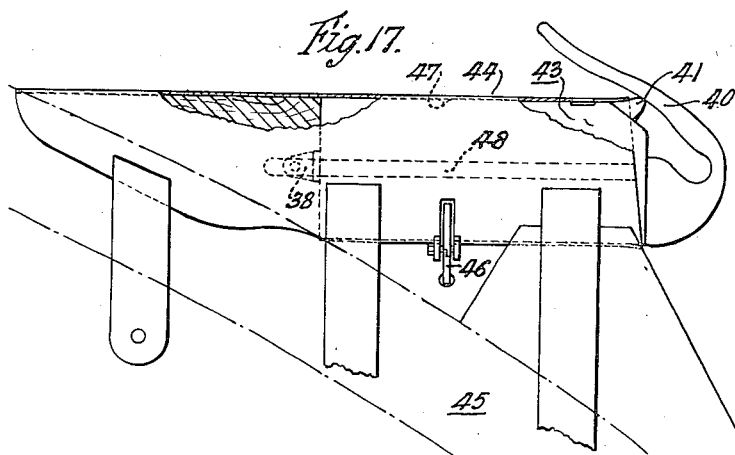
Figure 18:
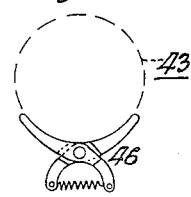

Figures 16–19 show details of another cable-engaging device and of its mounting on a wing tip. In this form the device consists of a clip 40 having a closing latch 41 urged to the closing position by the spring 42, and a weighted body portion 43 which is adapted to be located in a cylindrical housing 44 mounted on the wing tip 45 (viz. Figure 17), and open at its end adjacent the tip so as to leave the clip 40 exposed and projecting in front of the leading edge of the wing with its mouth towards the fuselage. When the trailing cable is intercepted, it will run along the leading edge as described above, past the latch 41 into the clip 40, the latch closing behind it, then pull the clip and body out of the housing 44, where it is retained merely by the scissor clip 46 (Figure 18) which lightly grips around the groove 47 in the body.

Figure 19:
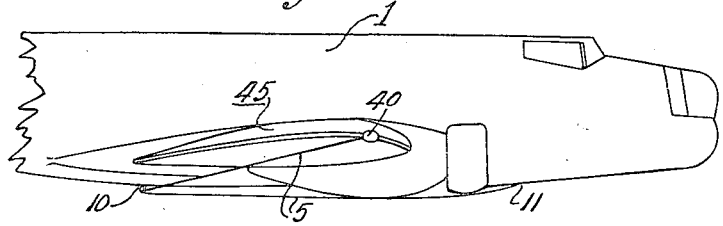
Figure 19 is a part side view of an aircraft showing the location of the cable-engaging device and its retaining cable.

The cable-engaging device is however retained in connection with the tanker aircraft 1 by the cable 5 which is secured to the inner end of the body 43 and passes through the slot 48 in the casing to a manually controlled quick release device located at 10 (viz. Figure 19) on the under part of the fuselage of the aircraft and then forward to its connection at 11 with the winch mounted in the aircraft.

Figure 20 shows a still further construction for the trailing cable 6 which consists of a V-shaped structure 17, 18, similar to that shown in Figures 10 and 11 across the mouth of which is positioned the C-shaped tube 49 open at one end. This tube 49 has its slit directed towards the front and within the tube is slidably mounted the cable-engaging device which may for example be substantially identical with the device shown in Figure 16. The device, indicated generally at 50 is held at one end of the tube 49 by a pin 51 extending into the body of the device and mounted on the end of a Bowden wire control operable from the cockpit at 52 to withdraw the pin 51 and release the device. The device has secured to it a cable 53 which passes through the tube 49 over a pulley 54, located adjacent the open end of the tube 49, to a depending weight 55 which is connected to the cable 5 passing to a winch 56 in the aircraft.

In operation the aircraft is manoeuvred to intercept the trailing cable 6 with the tube 49, whereupon an operator releases the device 50 by means of the Bowden control so that the device under the action of the weight 55, slides along the tube catching and retaining the cable 6 as it slides, and drops clear of the aircraft 1 to hang from the cable 5.

What we claim is:

1. Apparatus for use in establishing a cable connection between aircraft in flight which comprises in combination with an aircraft, a cable-engaging device, a mounting on said aircraft for releasably holding said device, and a cable on said aircraft connected to said device to retain it when released from said mounting.

2. Apparatus for use in establishing a cable connection between aircraft in flight which comprises in combination with an aircraft, a cable-engaging device having sufficient clearance to retain another cable while allowing the second cable to move longitudinally through the device, a mounting on said aircraft for releasably holding said device, and a cable on said aircraft connected to said device to retain it when released from said mounting.

3. Apparatus for use in establishing a cable connection between aircraft in flight which comprises in combination with an aircraft, a cable-engaging device, a mounting on said aircraft for releasably holding said device, intercepting and guiding means on the aircraft serving to lead to said cable-engaging device a cable trailing from another aircraft, and a cable on said aircraft connected to said device to retain it when released from said mounting.

4. Apparatus for use in establishing a cable connection between aircraft in flight which comprises in combination with an aircraft, a cable-engaging device, a mounting on said aircraft for releasably holding said device, intercepting and guiding means on the aircraft serving to lead to said cable-engaging device a cable trailing from another aircraft, a cable on said aircraft connected to said device to retain it when released from said mounting, said cable-engaging device having the space which retains the trailing cable sufficiently large to allow the trailing cable to move longitudinally therethrough.

5. Apparatus for use in establishing a cable connection between aircraft in flight which comprises in combination with an aircraft a cable-intercepting structure consisting of two arms radiating forwardly and outwardly from a point on the nose of the aircraft, and a return portion for each of said arms leading back one to each side of the nose.

6. Apparatus for use in establishing a cable connection between aircraft in flight which comprises in combination with an aircraft, a cable-engaging device, a mounting on said aircraft for releasably holding said device, a cable on said aircraft connected to said device so as to retain the device when released from its mounting and to draw it to the aircraft, and a cable-intercepting structure projecting forwardly of the aircraft and presenting an opening to the front, the structure having sides converging rearwardly towards said cable-engaging device to guide the intercepted cable into the device.

7. Apparatus for use in establishing a cable connection between aircraft in flight which comprises in combination with an aircraft, a cable-engaging device, a mounting on said aircraft for releasably holding said device, a cable on said aircraft connected to said device so as to retain the device when released from its mounting and to draw it to the aircraft, and an intercepting structure projecting forwardly of the aircraft and presenting an opening to the front, the structure having sides converging rearwardly, said structure serving to intercept a cable trailing from another craft and guide it towards said cable-engaging device, said device having a space of a size allowing the trailing cable to move longitudinally through the device.

8. Apparatus for use in establishing a cable connection between aircraft in flight which comprises in combination with an aircraft, a cable-engaging device, a mounting on a wing of said aircraft for releasably holding said device, and a cable on said aircraft connected to said device to retain it when released from its mounting.

9. Apparatus for use in establishing a cable connection between aircraft in flight which comprises in combination with an aircraft, a cable-engaging device having a space of a size to retain another cable whilst allowing it to move longitudinally through the device, a mounting on a wing of said aircraft for releasably holding said device, and a cable on said aircraft connected to said device to retain it when released from its mounting.

10. Apparatus for use in establishing a cable connection between aircraft in flight which comprises in combination with an aircraft a cable-engaging device, a mounting on a wing of said aircraft for releasably holding said device, a cable on said aircraft connected to said device to retain it when released from its mounting, and intercepting and guiding means serving to lead to said cable-engaging device a cable trailing from another aircraft.

11. Apparatus for use in establishing a cable connection between aircraft in flight which comprises in combination with an aircraft, a cable-engaging device, a mounting on a wing of said aircraft for releasably holding said device, a cable on said aircraft connected to said device to retain it when released from its mounting, and intercepting and guiding means serving to lead to said cable-engaging device a cable trailing from another aircraft, said cable-engaging device having a space of a size to retain that trailing cable whilst allowing it to move longitudinally therethrough.

12. Apparatus for use in establishing a cable connection between aircraft in flight which comprises in combination with an aircraft, a cable-engaging device, a mounting on a wing of said aircraft for releasably holding said device, a cable on said aircraft connected to said device to retain it when released from its mounting, and a cable-intercepting member extending from adjacent the nose of the aircraft to a point on the said wing.

13. Apparatus for use in establishing a cable connection between aircraft in flight which comprises in combination with an aircraft, a cable-engaging device, a mounting on a wing of the aircraft for releasably holding said device, a cable on said aircraft connected to said device to retain it when released from its mounting, and a cable-intercepting member extending from adjacent the nose of the aircraft to a point on the said wing, said member serving to intercept a cable trailing from a second aircraft and guide it towards the said cable-engaging device, said device having a space to retain that trailing cable of a size allowing it to move longitudinally therethrough.

14. Apparatus for use in establishing a cable connection between aircraft in flight which comprises in combination with an aircraft, a cable-engaging device, a mounting on a wing of said aircraft for releasably holding said device, a cable on said aircraft connected to said device to retain it when released from its mounting, and a cable-intercepting member extending from an under part of the aircraft to a point on the said wing.

15. Apparatus for use in establishing a cable connection between aircraft in flight which comprises in combination with an aircraft, a cable-engaging device, a mounting on a wing of the aircraft for releasably holding said device, a cable on said aircraft connected to said device to retain it when released from its mounting, and a cable-intercepting member extending from an under part of the aircraft to a point on the said wing, said member serving to intercept a cable trailing from a second aircraft and guide it towards the said cable-engaging device, said device having a space to retain that trailing cable of a size allowing it to move longitudinally therethrough.

16. Apparatus for use in establishing a cable connection between aircraft in flight which comprises in combination with an aircraft a cable, a cable-engaging device secured to the cable, a structure extending forwardly of said aircraft, a transverse cable intercepting member on the front of said structure, a mounting for said cable-engaging device on said transverse member, means for releasing said device from its mounting and means causing it to run across substantially the whole length of said transverse member and drop clear thereof.

17. Apparatus for use in establishing a cable connection between aircraft in flight which comprises in combination with an aircraft a cable, a cable-engaging device secured to said cable, a V-shaped structure mounted on the nose of the aircraft, a C-shaped tube open at at least one end and extending across the mouth of said structure with the slit in the tube directed to the front, means for releasably retaining said cable-engaging device within said tube with its cable-engaging portion extending through the slit, and means for causing the device to run across substantially the whole length of said tube and out of said open end.

18. Apparatus for use in establishing a cable connection between aircraft in flight which comprises in combination with an aircraft a cable, a cable-engaging device secured to said cable, a V-shaped structure mounted on the nose of the aircraft, a C-shaped tube open at at least one end and extending across the mouth of said structure with the slit in the tube directed to the front, said cable-engaging device being slidably disposed within said tube with its cable-engaging portion extending through the slit, a depending weight on said cable tending to pull said device along and out of said tube, and means releasably holding said device in said tube.

19. Apparatus for use in establishing a cable connection between aircraft in flight which comprises in combination with an aircraft, a clip-like cable-engaging device, a mounting on a wing of the aircraft for said device, means releasably retaining said device in its mounting, and a cable on said aircraft connected to said device to retain it when released from its mounting.

20. Apparatus for use in establishing a cable connection between aircraft in flight which comprises in combination with an aircraft, a cable-engaging device, a quick-release device, a mounting on a wing of the aircraft for said cable-engaging device, means releasably retaining said device in its mounting, and a cable extending through said quick-release device connected to said cable-engaging device to retain the latter when released from its mounting.

21. Apparatus for use in establishing a cable connection between aircraft in flight which comprises in combination with an aircraft, a pincer-like device having parts mounted to open through movement of one part relatively to the remainder to receive a cable therebetween, means for automatically closing said device after a cable has entered therein, the space between said parts in closed position being of a size allowing an entered cable to move longitudinally through the device, a mounting on said aircraft for releasably holding said device, and a cable on said aircraft connected to said device to retain it when released from its mounting.

22. Apparatus for use in establishing a cable connection between aircraft in flight which comprises in combination with an aircraft, a pincer-like device having parts mounted to open through movement of one part relatively to the remainder to receive a cable therebetween, a trip mechanism operable to close the parts, a mounting on the aircraft for releasably holding said device, control means for operating said trip mechanism and releasing said cable-engaging device from its mounting, and a cable on said aircraft connected to said device to retain it when released from its mounting.

23. Apparatus for use in establishing a cable connection between aircraft in flight which comprises in combination with an aircraft, a cable-engaging device having a cable-receiving space and a lateral entrance thereto, means controllable by an engaged cable to constrict said entrance after reception of an engaged cable to retain the latter, a mounting on the aircraft to releasably hold said device in position for reception of a cable, and a cable on said aircraft connected to said device to retain it when released from said mounting.

ALAN JOHN COBHAM.
PERCY RAYMOND ALLISON.
EDWARD JAMES TRIPP.